June 28, 1938. E. EGER 2,121,955

PNEUMATIC TIRE TREAD

Filed June 13, 1936

INVENTOR.
ERNST EGER
BY
ATTORNEY.

Patented June 28, 1938

2,121,955

UNITED STATES PATENT OFFICE 2,121,955

PNEUMATIC TIRE TREAD

Ernst Eger, Grosse Pointe Park, Mich., assignor to United States Rubber Products, Inc., New York, N. Y., a corporation of Delaware Application June 13, 1936, Serial No. 85,099

9 Claims. (Cl. 152—209)

This invention relates to pneumatic tires, and in particular it relates to pneumatic tire treads and to the structural formation of the antiskid formation to increase the efficiency of such tires in operation. In general, the invention refers to a pneumatic tire having a tread comprising a plurality of relatively narrow, circumferential ribs divided circumferentially by a plurality of transverse incisions such as slits or narrow slots having their bases terminating in openings which extend parallel with the slits.

In tires having treads with transverse slits or narrow slots for improving skid qualities there is a tendency for the bases to continue to extend deeper in the form of cracks. To overcome this condition it has been the practice to slit the tire to a relatively shallow depth, less than the depth of the tread rubber, and to space the slits a substantial distance apart.

An object of my invention is to prevent cracking of slit or slotted tread tires; another object is to permit the tread to be slit to a depth substantially equal to the wearing portion of the tread; and a further object is to permit the slits to be spaced a less distance apart. As a result of these objects a tire of improved antiskid and wearing qualities is obtained.

These and other objects and advantages will appear more fully in the following detailed description when considered in connection with the accompanying drawing, in which:—

Figure 1:
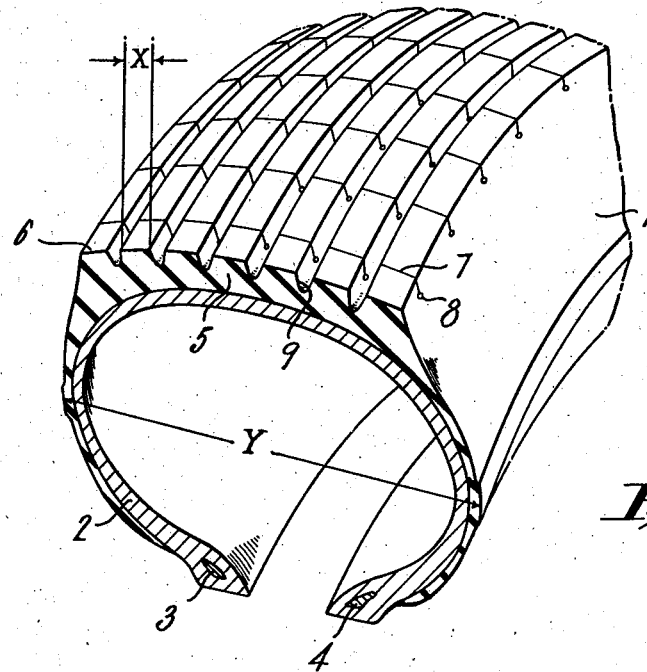
Fig. 1 is a transverse view, in section and in perspective, of a portion of a pneumatic tire embodying my invention.

Referring to the drawing, and in particular to Fig. 1, I show a pneumatic tire 1 having a carcass 2 of strain resisting elements, inextensible bead elements 3 and 4, and a wear resistant tread 5 of rubber composition.

In formation the tread 5 is illustrated in the form of a plurality of circumferentially extending ribs 6. While the features of my invention are applicable to treads having designs of various configurations, I prefer its application to a tread design of plain, circumferential ribs. It has been demonstrated that a tread comprising circumferential ribs of a width within definite limitations shows a substantial improvement in antiskid qualities, particularly on wet road surfaces. It is well known that a tread of rib formation is relatively quiet in operation. Such a tread is particularly improved after subjection to the present method of tread treatment.

Experiments have indicated that the width of the ribs should not be less than 3 percent of the normal width of the tire in cross section, and that the maximum width of the rib should not exceed 8 percent of the normal width of the tire in cross section. In other words, the dimension X as shown in Fig. 1 should be equal to from 3 to 8 percent of the dimensional character Y.

Figure 2:
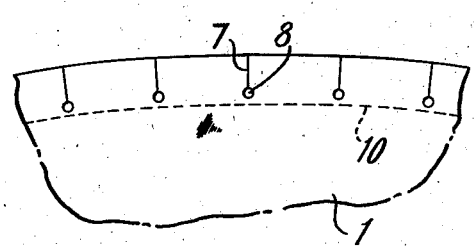
Fig. 2 is a side elevational view of a portion of the tire shown in Fig. 1.

Subsequent to the vulcanization of the tire, the tire tread is subjected to a slitting operation for producing narrow cuts or incisions 7 in the tread transversely of the ribs. The bases of these slits terminate in small apertures 8 which extend parallel with the slits. Fig. 2 illustrates a side view of the tire 1 and shows the proportionate size of the apertures 8. The rib formation 6 is defined by a plurality of grooves 9, having bases 10.

Figure 3:
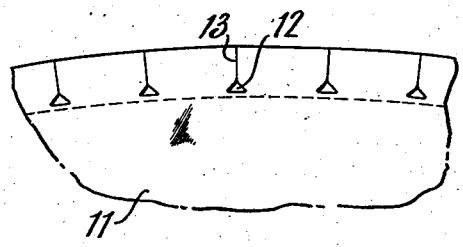
Fig. 3 is a similar view illustrating a modified form of the invention.

As shown in Fig. 2, the apertures 8 are positioned slightly above the bases 10 of the grooves so that the apertures 8 which lie between the grooves 9 will be free from the curvatures at the bases 10. While the apertures 8 are shown in the form of circular openings, it is to be understood that they may be of various shapes such as that indicated in Fig. 3, wherein a tire 11 is provided with apertures 12 in the form of triangular openings which communicate with slits 13. Any form of opening at the bases of the slits is sufficient to accomplish the advantages of the present invention, provided the bases of the apertures are flat or substantially flat, or curved as in the lower portion of a circular aperture, as such shapes being free from sharp edges, tend to prevent crack propagation toward the carcass 2.

The size of the apertures disposed at the base of the slits is not of particular importance so long as they do not materially impair the strength of the ribs. I find, however, that good results are obtained from a tire having apertures which measure from about $\frac{1}{64}$ inch to $\frac{1}{8}$ inch in general diameter. The size of the aperture is somewhat determined by the method used to provide such apertures in the tread. For example, a hot wire may be forced into the slit of the tread and permitted to lodge at the base of the slit for a short period. In such case the resulting aperture will be relatively small. The apertures may also be produced by a knife having the combined shape of the slit and the opening at the base of the slit. In such case the slit and the aperture may be cut into the tread in the same operation.

It is also possible to produce the transverse apertures in the tread by providing removable pins in the mold, and forming the apertures in the rubber during vulcanization of the tire. In such case the tire would be subsequently slit in such manner that the cuts would extend into the previously formed apertures.

While I prefer to make slits in the limited sense of the word, that is by making incisions without the removal of substantially any of the tread rubber; yet the invention is applicable to narrow slots or incisions whose side walls are normally out of engagement, such as would be produced by a saw cut, but which engage for cooperative support when a load is applied, and such slots are included in the term "incisions" as herein used.

While I have shown the slits and communicating apertures extending transversely of all of the circumferentially extending ribs, it is to be understood that the slits and their accompanying base apertures may extend in a wide variety of patterns, such as diagonally of the circumferential ribs, or they may extend only into certain of the ribs or combinations thereof, depending upon the particular slit formation desired.

While I have shown and described certain preferred embodiments of my invention, it will be understood that modifications may be made therein without departing from the spirit of the invention or the scope of the appended claims.

Having thus described my invention, what I claim and desire to protect by Letters Patent is:—

1. A pneumatic tire having a carcass of strain resisting elements and an outlying tread of vulcanized and wear resistant rubber composition, said tread having an antiskid configuration and being provided with a plurality of relatively small openings extending more transversely than circumferentially located between the ground-contacting surface of the tread and the underlying carcass, said tread being provided with slits extending from said openings outward to the ground contacting surface of the tread, the walls defining said slits being substantially parallel and spaced apart a substantially less distance than the width of said openings.

2. A pneumatic tire having a carcass of strain resisting elements and an outlying tread of vulcanized and wear resistant rubber composition, said tread being provided with an antiskid configuration defined by grooves molded into the tread, and said tread being provided with a multiplicity of small openings extending more transversely than circumferentially located between the ground contacting surface of the tread and the bottoms of said grooves, said tread being provided with incisions substantially narrower than said openings and extending from said openings to the ground contacting surface of the tread.

3. A pneumatic tire having a carcass of strain resisting elements and an outlying tread of vulcanized and wear resistant rubber composition, said tread being provided with a plurality of circumferentially extending ribs, each of said ribs being provided with a plurality of relatively small openings extending relatively transversely of the ribs and located between the outer free face of each rib and its base, and an incision extending from each of said openings outwardly to the outer free face of the rib in which the opening is provided.

4. A pneumatic tire comprising a carcass of strain resisting elements and a tread of rubber composition defining antiskid elements which are interrupted by spaced incisions of a width such that when under load their side walls engage for appreciable distances for mutual support and terminating in enlarged openings for the prevention of crack propagation into the underlying rubber composition.

5. A pneumatic tire comprising a carcass of strain resisting elements and a tread of rubber composition defining antiskid elements which are interrupted by spaced slits whose walls are substantially parallel and normally in engagement for a considerable distance and which terminate well within the tread rubber composition in enlarged openings for the prevention of crack propagation into the underlying rubber composition.

6. A pneumatic tire comprising a carcass of strain resisting elements and a tread of rubber composition defining circumferential, functionally continuous ribs and intervening grooves, said ribs having spaced incisions of a width such that when under load their side walls engage for appreciable distances for mutual support and terminating in enlarged openings for the prevention of crack propagation into the underlying rubber composition.

7. A pneumatic tire comprising a carcass of strain resisting elements and a tread of rubber composition defining circumferential, functionally continuous ribs and intervening grooves, said ribs having spaced slits whose walls are substantially parallel and normally in engagement for a considerable distance and which terminate well within the tread rubber composition in enlarged openings for the prevention of crack propagation into the underlying rubber composition.

8. A pneumatic tire comprising a carcass of strain resisting elements and a tread of rubber composition defining circumferential, functionally continuous ribs of a width of the order of from 3 to 8 percent of the maximum width of the tire and intervening grooves, said ribs having spaced incisions of a width such that when under load their side walls engage for appreciable distances for mutual support and terminating in enlarged openings for the prevention of crack propagation into the underlying rubber composition.

9. A pneumatic tire comprising a carcass of strain resisting elements and a tread of rubber composition defining circumferential, functionally continuous ribs of a width of the order of from 3 to 8 percent of the maximum width of the tire and intervening grooves, said ribs having spaced slits whose walls are substantially parallel and normally in engagement for a considerable distance and which terminate well within the tread rubber composition in enlarged openings for the prevention of crack propagation into the underlying rubber composition.

ERNST EGER.